H. BAUCHET.
GROUND GRIPPING DEVICE FOR TRACTORS.
APPLICATION FILED AUG. 11, 1919.

1,395,549.

Patented Nov. 1, 1921.

Inventor
H. Bauchet,
By H. R. Kerslake
Attorney

UNITED STATES PATENT OFFICE.

HENRY BAUCHET, OF SENS, FRANCE.

GROUND-GRIPPING DEVICE FOR TRACTORS.

1,395,549.   Specification of Letters Patent.   Patented Nov. 1, 1921.

Application filed August 11, 1919. Serial No. 316,754.

*To all whom it may concern:*

Be it known that I, HENRY BAUCHET, a citizen of the French Republic, residing at Sens, Yonne, France, have invented certain new and useful Improvements in Ground-Gripping Devices for Tractors, of which the following is a specification.

This invention has for its object to provide an improved ground-gripping device or bar for tractors.

The improved ground-gripping bar has the peculiarity of being capable of being mounted and dismounted instantaneously.

One embodiment of this invention is illustrated by way of example in the accompanying drawings in which.

Figure 1:
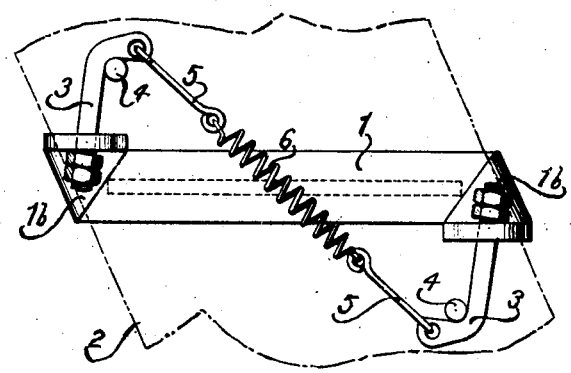
Figure 1 is an inside view of the improved ground-gripping device.
Figure 2:
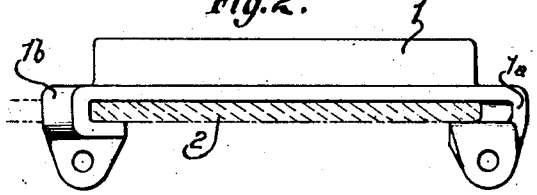
Fig. 2 is a side elevation thereof.
Figure 3:
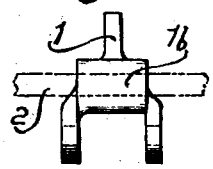
Fig. 3 is an end elevation thereof.

As shown, the improved ground-gripping device consists of a bar 1 of T-section made of cast steel or other suitable material. Its profile may vary according to requirements.

This bar 1 has at its ends bent-over lugs $1^a$ and $1^b$ into the recesses of which the wheel rim 2 is adapted to fit with a small amount of play. The shape of the bar 1 is such that when it is brought transversely up to the said rim, the bent-over lugs are able to pass over the width of the said rim.

On bringing the improved device into an oblique position relatively to the wheel rim, the lugs engage the two ends of the wheel rim and they are held in this position by hook bolts 3 which may be adjustable and which are bent so as to fit around the spokes 4 of the wheel. The hook bolts 3 are locked in position by means of movable safety rods 5 pivotally connected to the hook bolts.

These rods 5 are connected together by a spring 6 which is sufficiently weak to allow of the device being mounted and dismounted by hand.

Figure 4:
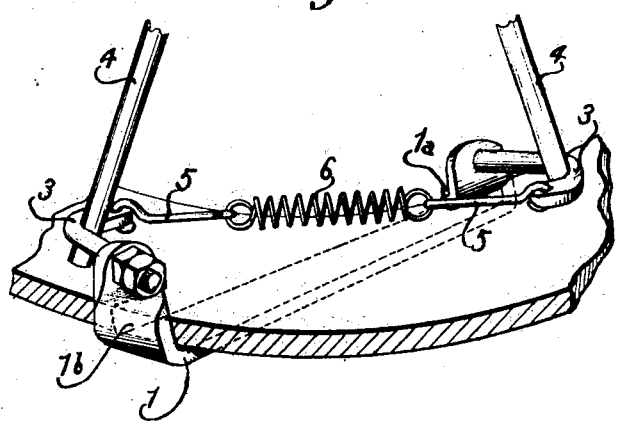
Fig. 4 is a perspective view of the improved device mounted on a wheel rim.

The improved device is dismounted instantly by unhooking the spring. In practice, two movements only are required to detach a bar. The first consists in disengaging the hook 5 shown at the right hand of Fig. 4, the end of which engages the eye at the end of hook bolt 3 and the second in swinging the bar 1 across the rim 2 in such a manner that the bar 1 will be returned to a position approximately perpendicular to the edge of the rim. It will be understood that the bar, which occupies an oblique position with respect to the rim edge while it is secured by the spring, will present a much greater length than the breadth of the rim when in the perpendicular position, thus allowing it to be easily removed from the latter.

It is to be understood that the bar 1 may also be in the form of a fillet, and may comprise pointed studs, teeth, etc.

What I claim is:—

1. In a detachable ground-gripping device for tractor wheels, the combination of a metal bar adapted to extend across the rim of the tractor wheel, formed at each end with a bent-over lug adapted to receive the edge of the tractor wheel rim, a pair of hook bolts engaging said lugs, shaped so as to bend around the adjacent wheel spokes, and a spring detachably connected at its end to said hook bolts.

2. In a detachable ground-gripping device for tractor wheels, the combination of a T-bar adapted to extend across the rim of a tractor wheel, a bent-over lug formed on each end of said bar, with a recess adapted to receive the edge of the tractor wheel rim, a pair of hook bolts engaging the two bent-over lugs, a rod connected at one end to each of said hook bolts, and a tension coil spring detachably connected to the other ends of the two rods, for pulling said hook bolts toward each other and thereby holding the device upon the wheel rim.

In testimony whereof I have signed my name to this specification.

HENRY BAUCHET.